A1

(12) United States Patent
Saulys et al.

(10) Patent No.: US 7,305,667 B1
(45) Date of Patent: Dec. 4, 2007

(54) CALL BACK STRUCTURES FOR USER DEFINED DOMS

(75) Inventors: Tomas Saulys, San Francisco, CA (US); Sheng-Yih Guan, Belmont, CA (US); Ian Macky, San Mateo, CA (US); Bhushan Khaladkar, Mountain View, CA (US); Deepak Agrawal, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 593 days.

(21) Appl. No.: 10/171,796

(22) Filed: Jun. 13, 2002

Related U.S. Application Data

(60) Provisional application No. 60/379,089, filed on May 8, 2002, provisional application No. 60/298,437, filed on Jun. 15, 2001.

(51) Int. Cl.
  *G06F 9/44*  (2006.01)
(52) U.S. Cl. ............... 717/143; 717/100; 717/108; 717/144; 719/328
(58) Field of Classification Search ............... 719/328; 707/6; 717/100, 108, 143, 144; 715/513, 715/746
See application file for complete search history.

(56) References Cited

U.S. PATENT DOCUMENTS

| | | | |
|---|---|---|---|
| 6,108,698 A | 8/2000 | Tenev et al. | |
| 6,584,458 B1 | 6/2003 | Millett et al. | |
| 6,654,761 B2 | 11/2003 | Tenev et al. | |
| 6,662,342 B1 * | 12/2003 | Marcy | 715/513 |
| 6,675,230 B1 * | 1/2004 | Lewallen | 719/328 |
| 6,721,723 B1 | 4/2004 | Gibson et al. | |
| 6,801,224 B1 * | 10/2004 | Lewallen | 715/746 |
| 6,804,677 B2 | 10/2004 | Shadmon et al. | |
| 6,826,568 B2 * | 11/2004 | Bernstein et al. | 707/6 |
| 6,915,304 B2 | 7/2005 | Krupa | |
| 6,964,025 B2 | 11/2005 | Angiulo et al. | |
| 7,134,072 B1 * | 11/2006 | Lovett et al. | 715/513 |
| 2002/0087596 A1 | 7/2002 | Lewontin | |
| 2002/0116371 A1 | 8/2002 | Dodds et al. | |
| 2002/0184188 A1 | 12/2002 | Mandyam et al. | |

OTHER PUBLICATIONS

"Oracle 9i XML Developer's Kits Guide—XDK", Release 2 (9.2), Mar. 2002, 774 pages (Chapter 13-19 extracted, 88 pages). Online retrieved at <www.oracle.com/pls/db92/db92.docindex>.*
Deepak Agrawal, et al., "A C/C++ XSLT Processor Architecture Optimized for Application Development", May 21-25, 2001, Internationales Congress Centrum (ICC) Berlin, Germany, 15 pages.

* cited by examiner

*Primary Examiner*—Tuan Dam
*Assistant Examiner*—Thuy Dao
(74) *Attorney, Agent, or Firm*—Hickman Palermo Truong & Becker LLP

(57) ABSTRACT

Described herein are techniques that allow applications developed in non-object oriented languages, such as C, to interact with DOM trees implemented under different DOM implementations. An application accesses different DOM implementations through a set of function pointers that conform to a set of function signatures. The set of function pointers may be stored in a data structure defined to have member function pointers that point to functions that conform to the set of function signatures. The set of function signatures define a common interface through which applications may interact with a variety of DOM implementations. One or more applications generate the set of function pointers and store them in a data structure. The other applications register the function pointers with an application by, for example, passing a pointer to the data structure to the application.

18 Claims, 6 Drawing Sheets domnode

```
typedef struct domcb
{
    ...
202 —   domnode* (*getParentNode)(const domnode *node);
204 —   domnodetype (*getNodeType)(const domnode *node);
        domelementnode* (*createElem)func(const domdocnode *doc,const text
            *tagname);
        domattrnode* (*createAttr)(const domdocnode *doc, const text *name,
            const oratext *value);
        const text* (*getNodeName)(const domnode *node);
        const oratext* (*getNodeValue)(const domnode *node);
        void (*setNodeValue)(domnode *node, const oratext *data);
        domnode* (*insertBefore)(domnode *parent, domnode *newChild, domnode
            *refChild);
    ...
}
```

FIG. 2 domdoc

\

```
      typedef struct domdoc {
302 — domdocnode *doc;
304 — domcb *domcb;
      }domdoc;
```

FIG. 3

CALL BACK STRUCTURES FOR USER DEFINED DOMS

RELATED APPLICATION

This patent application claims priority from U.S. Provisional Patent Application No. 60/298,437, entitled "MANAGING XML IN A DATABASE", filed by Mark J. Barrenechea, on Jun. 15, 2001, the contents of which are herein incorporated by reference in its entirety; the patent also claims priority from U.S. Provisional Patent Application No. 60/379,089, entitled "CALL BACK STRUCTURES FOR USER DEFINED DOMs", filed by Tomas Saulys, et al. on May 8, 2002, the contents of which are herein incorporated by reference in its entirety.

FIELD OF THE INVENTION

The present invention relates to interfacing with in-memory representations of XML entities, and in particular, providing a common abstraction to interface with multiple DOM implementations.

BACKGROUND OF THE INVENTION

The number of businesses exchanging information electronically is proliferating. Businesses that exchange information have recognized the need for a common standard for representing data. Extensible Markup Language ("XML") is rapidly becoming the common standard for representing data.

XML describes and provides structure to a body of data, such as a file or data packet, referred to herein as an XML entity. The XML standard provides for tags that delimit sections of an XML entity referred to as XML elements.

An element may contain various types of data, including attributes and other elements. An element that is contained by another element is referred to as a descendant of that element. By defining an element that contains attributes and descendant elements, the XML entity defines a hierarchical relationship between the element, its descendant elements, and its attributes. A set of elements that have such a hierarchical relationship is referred to herein as an XML tree.

Industry standards define structures for representing XML trees. One such standard is the Document Object Model (DOM), promulgated by the World Wide Web Consortium (W3C). An XML tree that conforms to the DOM standard is herein referred to as a DOM tree.

In order for a computer to operate on an XML tree, an in-memory representation of the XML tree is generated. In general, an XML tree is read from a storage device (e.g., a disk that stores files that contain XML entities) to create in-memory data structures used to represent an XML tree. The in-memory data structures are manipulated by applications running on the computer. Typically, the applications access and manipulate the data structures through a set of routines or functions designed for this purpose.

The term DOM implementation is used herein to refer to a definition of data structures used to represent a DOM tree, functions or routines that are designed and used to interact with the data structures, or a combination thereof. A DOM implementation may define only data structures. A DOM implementation may be a set of object classes that define attributes and methods.

The term "application" is used to refer to a set of interrelated software modules that, when executed, provide a particular service or functionality. The term is used to refer to a source code version of the software modules, an executable or runtime version of the software modules, which may be contained in one or more executable programs or files, or versions of the modules stored in a library as object code.

Typically, a DOM tree is represented as a node tree, which is a set of linked nodes that are hierarchically related. A node in the node tree represents, for example, an element or an attribute. Links between a node and another node represent a hierarchal tree relationship between the nodes and their corresponding elements. For example, a node corresponding to a parent element may be linked to nodes representing child elements of the parent element.

W3C specifications define a common DOM implementation. These include the Document Object Model (DOM) Level 2 Core Specification (W3C recommendation 13 Nov. 2000) (herein Level 2 Core Specification), and the Document Object Model (DOM) Level 1 Specification (W3C recommendation 1 Oct. 1998), herein Level 1 Specification, the contents of which are incorporated herein by reference.

The W3C specifications are for object oriented languages, such as Java and C++. However, there is no industry standard that has been developed for languages that are non-object oriented. Thus, developers of XML applications and utilities implemented using non-object oriented languages design and use a potpouri of DOM implementations, most, if not all of them, comporting to no particular standard or common design. Consequently, non-object oriented applications developed by one set of developers likely cannot use a DOM implentation implemented by another set of developers without reprogramming the applications. This may be true even for applications developed by sets of developers within the same business enterprise.

For example, an Extensible Style Language Transformation ("XSLT") processor is a software utility that interprets instructions written in the Extensible Style Language to transform an XML entity into another body of data conforming to another standard, such as another mark-up language (e.g. HTML), XML, or some other language. The reusability of a particular XSLT processor is enhanced if it can be used to translate data that is stored in structures that conform to different DOM implementations.

However, if an XSLT processor has to be reprogrammed to use each different DOM implementation, its reusability may be severely hampered. The time and effort for reprogramming an XSLT processor can be overwhelming, often making use of an XSLT processor for a particular application that uses a different DOM implementation very expensive and economically infeasible.

Based on the foregoing, it is desirable to provide a mechanism that allows a particular application written in a non-object oriented language to interact with different DOM implementations.

SUMMARY OF THE INVENTION

Described herein are techniques that allow applications developed in non-object oriented languages, such as C, to interact with DOM trees implemented under different DOM implementations. According to an aspect of the present invention, an application accesses different DOM implementations through a set of function pointers that conform to a set of function signatures. The set of function pointers may be stored in a data structure defined to have member function pointers that point to functions that conform to the set of function signatures. The set of function signatures define a common interface through which applications may interact with a variety of DOM implementations.

According to another aspect of the present invention, one or more applications generate the set of function pointers and store them in a data structure. The other applications register the function pointers by, for example, passing the pointer to the data structure to the application.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts a type definition of a call back structure that holds function pointers according to an embodiment of the present invention;

FIG. 3 depicts a type definition of a data structure used to associate a DOM tree with a call back structure that holds function pointers for accessing the DOM tree according to an embodiment of the present invention;

DETAILED DESCRIPTION OF THE INVENTION

A method and apparatus for providing a common abstraction of different DOM implementations is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
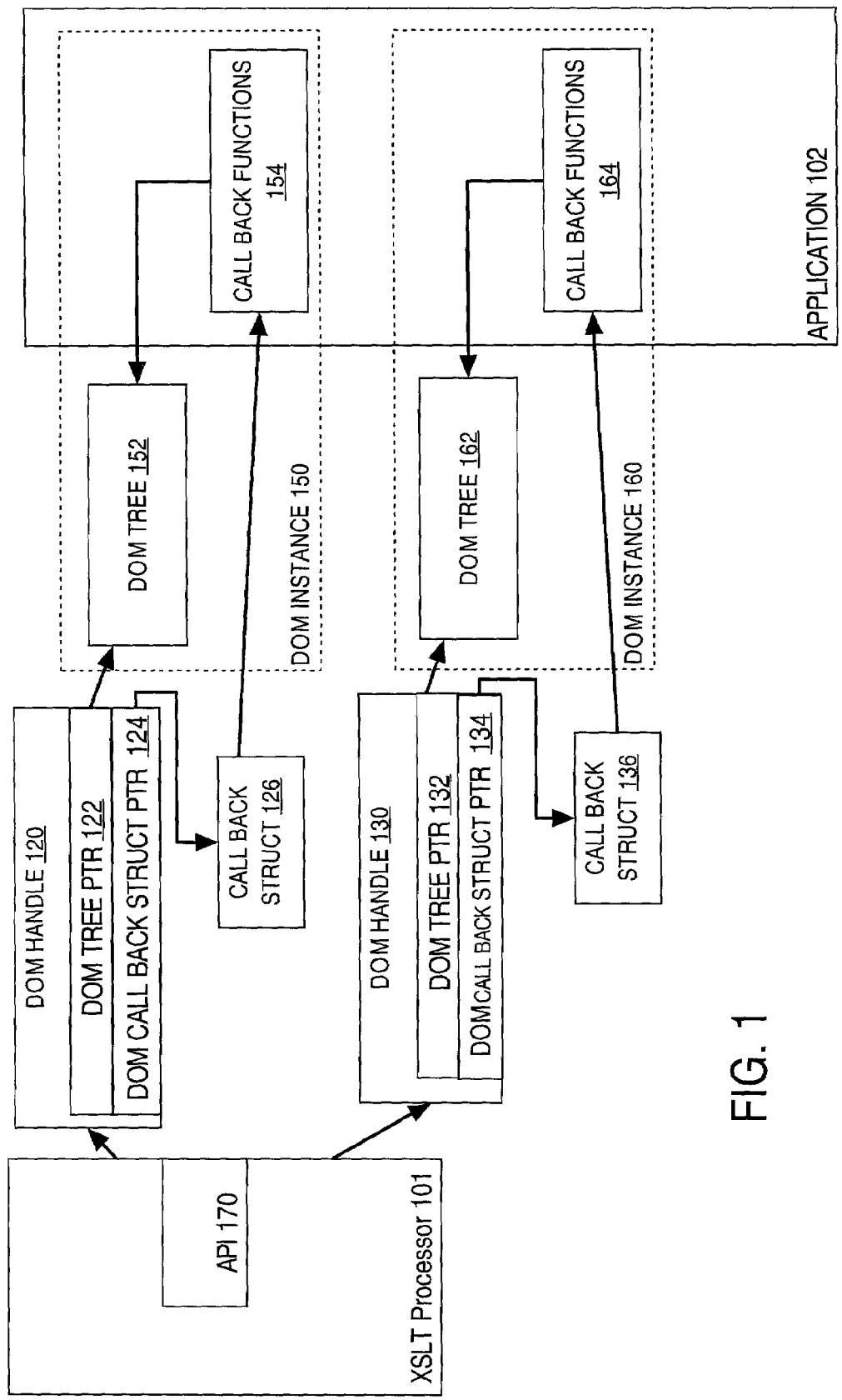
FIG. 1 depicts a runtime version of a call back enabled DOM application and in-memory data structures and function pointers through which the application accesses multiple DOM implementations according to an embodiment of the present invention.

Referring to FIG. 1, it is a runtime depiction of XSLT processor 101, a software application configured according to an embodiment of the present invention. XSLT processor 101 performs XSLT processing. Application 102 is an application that uses XSLT processor 101 to carry out XSLT processing.

Software entities (e.g. program, modules such as functions) are described herein as performing actions. However, this is just a convenient way of expressing that a computer, processor, or other entity capable of executing software, is performing the act in response to executing the software or executing a compiled version of the software. For example, the phrase XSLT processor 101 performing XSLT processing is just a convenient way of stating that an XSLT processor, when executed by a computer, causes the computer to perform XSLT processing.

To perform XSLT processing, XSLT processor 101 accesses DOM instances 150 and 160. DOM instances 150 and 160 are instances of different DOM implementations. A DOM instance is a set of data structures, functions, routines and procedures that conform to a particular DOM implementation. DOM instance 150 includes DOM Tree 152, which is a DOM tree represented by data stored in data structures defined by a particular DOM implementation. Call back functions 154 are functions implemented according to the particular DOM implementation.

DOM instance 160 is an instance of another DOM implementation. DOM instance 160 includes DOM tree 162 and call back functions 164.

DOM trees 152 and 162 are data structures generated by an application 102, and call back functions 154 and 164 are functions implemented in the application 102. Application 102 and XSLT processor 101 may be one or more software modules in an executable file or program. Alternatively, XSLT processor 101 may be separate executable entities, dynamically linked to the application 102 at run time.

XSLT processor 101 accesses DOM instances through call back struct 126 and call back struct 136. A call back structure, such as call back struct 126 and call back struct 136, is an aggregate data structure containing multiple members, each member being a pointer to a particular call back function. To invoke a particular function of call back functions 154, XSLT processor 101 invokes the function pointed to by the member corresponding to the particular function. The pointers stored in call back struct 126 and call back struct 136 are different because they point to different sets of call back functions.

Although they contain different pointers, call back struct 126 and call back struct 136 have the same type definition. An illustrative type definition is later described. XSLT processor 101 is configured to access multiple different DOM instances through call back structures of the same type definition.

Because call back struct 126 and call back struct 136 have the same type definition, the call back structures contain pointers to functions that have the same signature. A function signature is the series of data types defined for the function based on a particular order, typically the following order, the data type of the function's return value, followed by the data types of the function's parameters, in the order of the parameters. For example, the function definition below specifies the following signature (integer, integer, character).

int foo(int i, character c)

DOM handles 120 and 130 are aggregate data structures that associate a DOM instance with a call back structure that points to the functions used to access the DOM tree of the DOM instance. Each of DOM handles 120 and 130 contain member pointers. In DOM handle 120, DOM tree ptr 122 points to DOM tree 152, and DOM call back struct ptr 124 points to call back struct 126. In this way, DOM handle 120 links XSLT processor 101 to a DOM instance, and in particular, to its DOM tree and the call back functions through which XSLT processor 101 may access the DOM tree. In DOM handle 130, DOM tree ptr 132 points to DOM tree 162, and DOM call back struct ptr 134 points to call back struct 136.

API 170 is an Application Program Interface (API) through which other applications, such as application 102, access or otherwise use the services and functionality provided by XSLT processor 101. API 170 contains, for example, functions for registering DOM instances with XSLT processor 101. The term register refers to a process of providing information to an application which may be later used by the application to access the particular entity. For example, API 170 contains an API function for registering a DOM instance that contains XSLT instructions. The function accepts a pointer value to a DOM handle as a parameter. By invoking the API function and passing in the pointer value to DOM handle 120 as a parameter value, application 102 provides a pointer in the form DOM call back struct prt 124, which points to call back struct 126, which, in turn, has function pointers to call back functions 154 and DOM tree 152. In this way, call back functions 154, DOM tree 152, and DOM instance 150, are registered with XSLT processor 101.

XSLT processor 101 is representative of many types of applications that may be configured to access, through use of call back structures, DOM instances implemented under different DOM implementations. Applications configured in this way are referred to herein as call back enabled DOM applications. Call back enabled DOM applications include utilities, such as an XML parser, XML schema validator, and even specialized user applications that require access to DOM trees implemented according to different DOM implementations.

Type Definitions

Various aggregate structures have been mentioned to have a particular type definition. FIGS. 2 and 3 show illustrative type definitions for these aggregate structures that may be used in an embodiment of the present invention.

Referring to FIG. 2, it shows type definition domcb, which is represented in code written in the C programming language. Type definition domcb defines function pointers. For purposes of exposition, not all of the function pointers of domcb are depicted in FIG. 2. Preferably, a type definition includes functions that correspond to methods of the interface definitions in Appendix D: Language Java Language Binding, of both the Level 2 Core Specification and Level 1 Specification.

For example, domcb contains functions that correspond to interfaces defined in Appendix D: Language Java Language Binding in the Level 2 Core Specification (see section org/w3c/DOM/Node.java), herein the Level 2 Appendix D. Line 202 defines a function pointer to function getParentNode, which corresponds to the method getParentNode( ) in the Node interface defined in Level 2 Appendix D. Line 204 defines a pointer to a function getNodeType, which corresponds to the method getNodeType( ) in the Node interface.

Type definition domcb defines various functions and function parameters based on type definitions not specifically illustrated in the figures. Among these is the type definition domnode. Domnode is a type definition defining an aggregate data structure representing the basic node type in a DOM implementation. It is used to specify the date type of various pointers returned by functions and parameters passed into the functions. Nodes of a DOM instance are referenced by pointers returned or passed in as parameters through the pointed to functions defined by domcb.

For example, line 202 defines a member as a function pointer to a function that returns a pointer of the type domnode, that is, defined to point to a data structure typed as a domnode, and that has a parameter typed as a domnode.

FIG. 3 shows an illustrated type definition of a DOM handle. Referring to FIG. 3, it shows type definition domdoc. Domdoc defines several pointer numbers. At line 302, domdoc defines a member as a pointer of the type domdocnode, a type definition representing the root node of a DOM tree. At line 304, domdoc defines a member as a pointer to the call back structure of the type domcb.

Configuring an Application to Use Call Back Enabled DOM Application

A benefit of a call back enabled DOM application is that it may be used by different applications that use different DOM implementations without having to modify the DOM implementations. Instead, existing applications need only be modified by implementing features that include a call back structure, call back functions, a DOM handle, and mechanisms for registering a DOM instance, according to an embodiment of the present invention. In general, implementing such features requires less extensive modifications than would be required to modify a DOM implementation.

Figure 4:
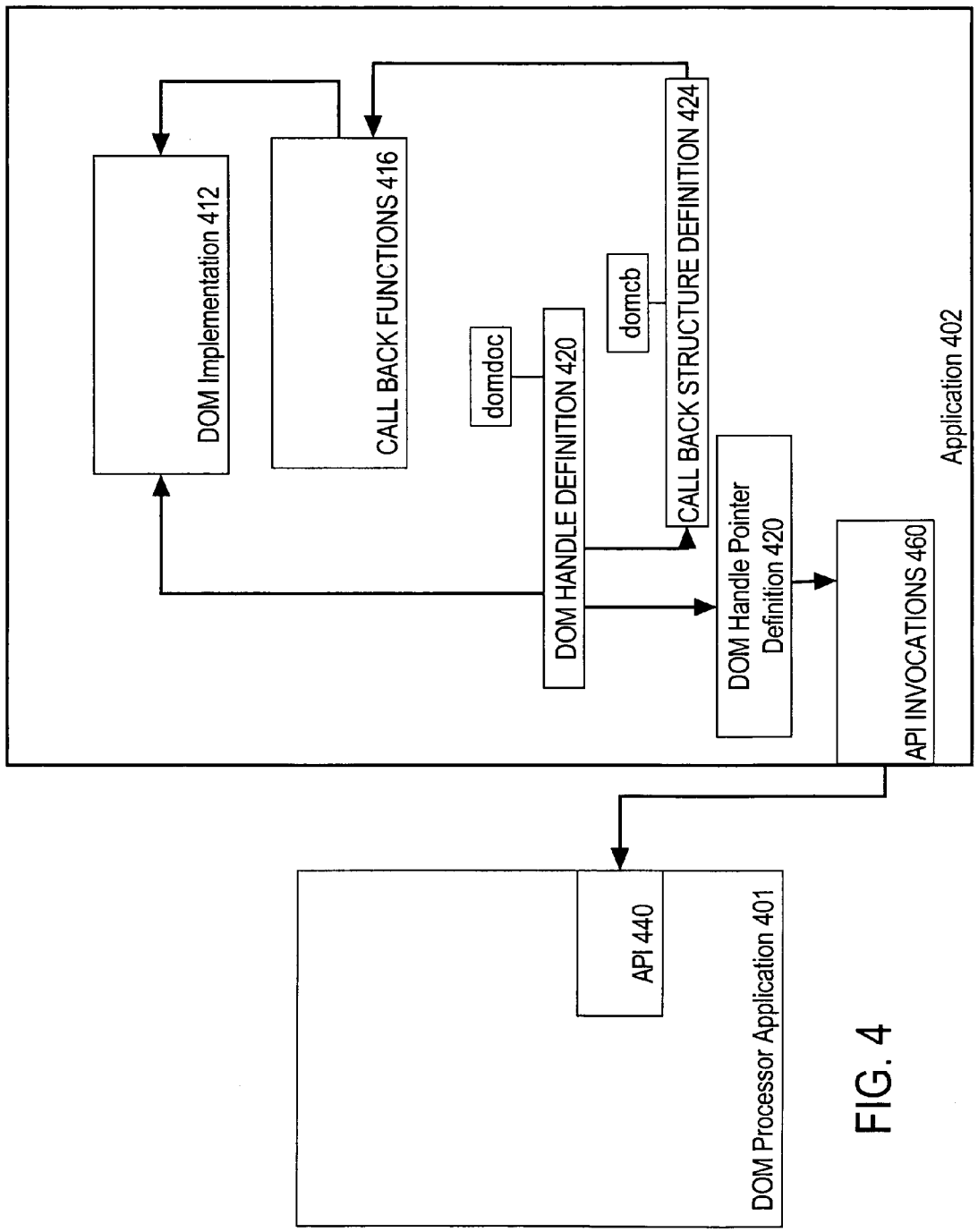
FIG. 4 depicts source code modules of an application configured to interface with different DOM implementations according to an embodiment of the present invention.

FIG. 4 is a block diagram depicting the structure of an application 402 that has been reconfigured to use a call back enabled DOM application. Referring to FIG. 4, its shows XSLT processor application 401 and application 402. Application 402 includes one or modules of source code that can be compiled, with other library modules and possibly other source code modules, to create an executable version of application 402. XSLT processor application 401 can be any of the following: (1) source code modules that are compiled along with application 402 to create an executable program, (2) precompiled modules in a library that can be linked with a compiled version of application 402, (3) or a library module that is dynamically linked with an executable version of application 402 when loaded for execution.

Application 402 contains DOM implementation 412. DOM implementation 412 includes software modules that define the data structures of a DOM implementation, and that implement functions, routines, procedures, and blocks of code that operate on the data structures.

Call back functions 416 are call back functions that are invoked by a call back enabled DOM application to access the DOM implementation, that is, access a DOM instance at DOM implementation. Call back functions are implemented as part of the reconfiguration of application 402. Call back functions 416 include functions that are implemented for a particular DOM implementation, to carryout the function's purpose and design (e.g., to return a reference to a parent node in a DOM tree). These operations include operations that access data structures defined by a DOM implementation, and functions and routines implemented according to the DOM implementation.

Call back structure definition 424 defines a call back structure with function pointers pointing to a function in call back functions 416. Call back structure definition 424 defines a call back structure of the type domcb.

DOM handle definition 420 defines a DOM handle of the type domdoc. Accordingly, it defines members that point to the root of the DOM tree defined by DOM implementation 412, and a pointer to a call back structure of the type domcb.

DOM handle pointer defines a pointer to the DOM handle defined by DOM handle definition 420.

API invocations 460 include function invocations of functions in API 440. Among these are one or more functions for registering DOM instances.

Application 402 illustrates how an application may be configured to interact with a call back enabled DOM application to have the call back enabled DOM application access a single instance of a single DOM implementation. Applications often have a need for a call back enabled DOM application to access multiple DOM implementations, or even multiple instances of a single DOM implementation.

To handle these situations, the application may implement another set of structures and functions to support the other DOM implementation, including another set of call back functions, a DOM handle definition, and call back structure definition. Alternatively, the same set of structures and functions may be used for the multiple DOM implementations, as shall be explained in greater detail.

Setting Up and Registering

Figure 5:
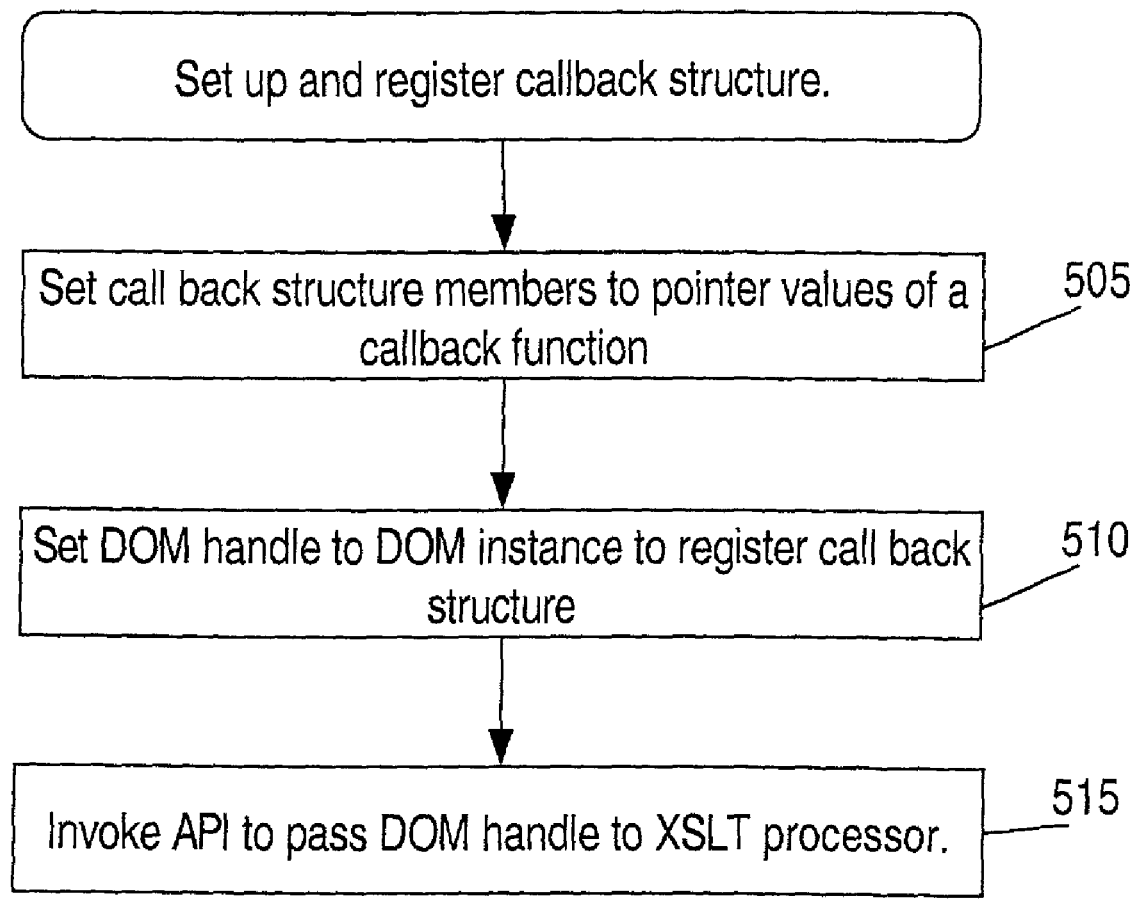
FIG. 5 depicts a process for providing call back structures to call back enabled DOM applications according to an embodiment of the present invention.

FIG. 5 shows a process that is followed by an application during runtime to enable a call back enabled DOM application to access an instance of a DOM implementation.

Referring to FIG. 5, at step 505, the member pointers of the call back structures are set to a pointer that points to a call back structure. At step 510, pointer members of the DOM handle are set to refer to the root node of the DOM implementation and to the call back structure. At step 515, the API of the XSLT processor is invoked to pass in the DOM handle, thereby registering the call back structure.

The process shown in FIG. 5 is performed for each DOM instance that is to be "registered" with a call back enabled DOM application, as is illustrated by the following example based on the entities shown in FIG. 1. For purposes of illustration, DOM tree 152 contains XML data to translate, and DOM tree 162 contains XSLT instructions describing how to translate the XML data.

When application 102 commences execution, at step 505, application 102 sets the pointer members of call back struct 126 to a function pointer which points to a function of call back functions 154. At step 510, the pointer members of DOM handle 120 are set. DOM tree ptr 122 is set to refer to the root node of DOM tree 152 and DOM call back struct prt 124 is set to point to call back struct 126. At step 515, a function of API 170, which is used to register DOM instances containing XML data to translate, is invoked to register DOM handle 120.

Next, the structures needed to register DOM instance 160 are set as needed and DOM instance 160 is registered. Specifically, at step 505, application 102 sets the pointer members of call back struct 136 to a function pointer which points to a function of call back functions 164. At step 510, the pointer members of DOM handle 130 are set. DOM tree ptr 132 is set to refer to the root node of DOM tree 162 and DOM call back struct prt 134 is set to point to call back struct 136. At step 515, a function of API 170, which is used to register DOM instances containing instructions for translating XML data, is invoked to register DOM handle 130.

After DOM instance 150 and 160 are registered, XSLT processor 101 may begin the process of translating the XML data in DOM tree 152. This process may be initiated by invoking a function of API 170.

After translating the XML data in DOM instance 150, it may be desirable to translate other XML data in another DOM instance using the same XSLT instructions in DOM tree 162 and data structures already set up during execution of the steps shown in FIG. 5. This may be accomplished by modifying the data structures as needed to link XSLT processor 101 to the other DOM instance and its DOM implementation. If the DOM instance is an instance of the same DOM implementation, then DOM tree ptr 122 in DOM handle 120 is set to point to the DOM tree of the other DOM instance. There is no need to change DOM call back struct ptr 124 or call back struct 126 because the same call back functions 154 may be used. If the DOM instance is not an instance of the same DOM implementation, then call back struct 126 may be modified to point to the call back functions for the different implementation. Alternatively, DOM call back struct ptr 124 may be set to a pointer to another call back structure for the call back functions for the different implementation. In this way, the data structures that link XSLT processor 101 to functions needed to access a particular DOM implementation may be dynamically changed to allow XSLT processor 101 to interact with multiple DOM implementations during runtime.

ALTERNATE EMBODIMENTS

In the present specification, the invention has been described with reference to specific embodiments thereof. It will, however, be evident that various modifications and changes may be made thereto without departing from the broader spirit and scope of the invention.

Embodiments have been illustrated using C code. However, the techniques described herein may be implemented using other computer languages. In fact, the techniques may be applied in object oriented languages, such as C/C++.

The specification and drawings are, accordingly, to be regarded in an illustrative rather than a restrictive sense.

Hardware Overview

Figure 6:
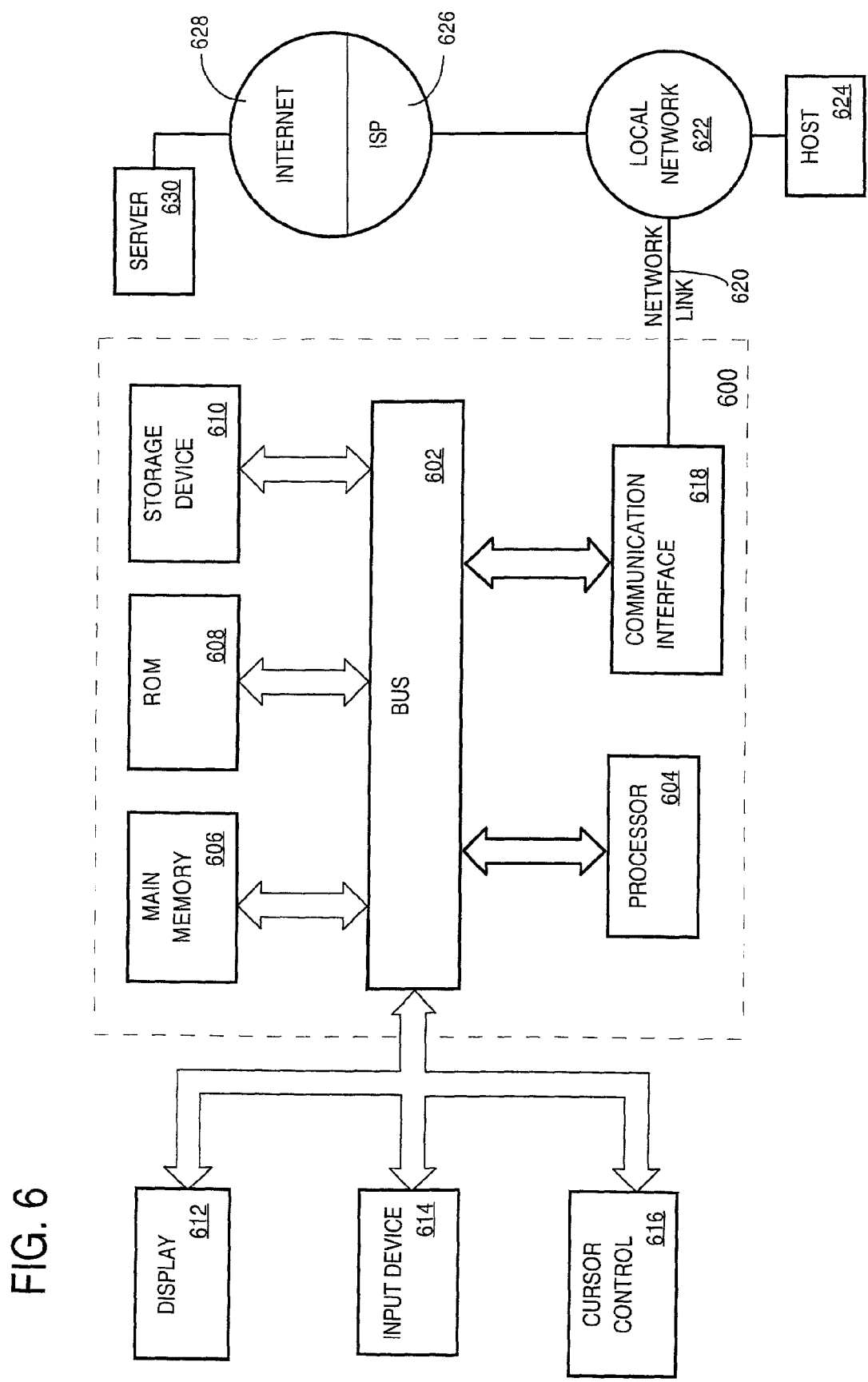
FIG. 6 is a block diagram of a computer system that may be used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

What is claimed is:

1. A computer-implemented method for accessing data represented in multiple implementations of a Document Object Model (DOM), the method comprising the steps of:
   a particular application setting a first set of function pointers to point to a first set of functions that conform to a particular set of signatures, wherein the first set of functions is associated with a first DOM implementation;
   said particular application invoking the first set of functions to access first data represented in the first DOM implementation; and
   said particular application setting a second set of function pointers to point to a second set of functions that conform to the particular set of signatures, wherein the second set of functions is associated with a second DOM implementation.

2. The method of claim 1,
   wherein the first set of function pointers are members of a first data structure; and
   wherein the steps further include modifying the members of the first data structure to point to a third set of functions after performing the step of invoking the first set of functions.

3. The method of claim 2, wherein the second set of function pointers are members of an other data structure, and wherein said first data structure and said other data structure have the same data type.

4. The method of claim 3, further including the step of said particular application generating said first data structure.

5. The method of claim 1, wherein
   the step of a particular application invoking the first set of functions includes invoking the first set of functions pointed to by members of a first data structure.

6. The method of claim 1, wherein the step of invoking the first set of functions includes invoking functions implemented in an other application different than said particular application.

7. The method of claim 6, further including the step of said particular application registering said first set of functions with said other application.

8. The method of claim 7, wherein
   the first set of function pointers are members of a data structure pointed to by a first pointer; and
   the step of registering includes supplying said pointer to said particular application.

9. The method of claim 1, wherein
   the first set of function pointers are members of a first data structure pointed to by a first pointer;
   a second data structure includes said first pointer as a member; and said second data structure includes another member that refers to a DOM tree implemented according to said first DOM implementation.

10. A computer-readable storage medium carrying one or more sequences of instructions for accessing data represented in multiple implementations of a Document Object Model (DOM), wherein execution of the one or more sequences of instructions by one or more processors causes the one or more processors to perform the steps of:

a particular application setting a first set of function pointers to point to a first set of functions that conform to a particular set of signatures, wherein the first set of functions is associated with a first DOM implementation;

said particular application invoking the first set of functions to access first data represented in the first DOM implementation; and said particular application setting a second set of function pointers to point to a second set of functions that conform to the particular set of signatures, wherein the second set of functions is associated with a second DOM implementation.

11. The computer-readable storage medium of claim 10, wherein the first set of function pointers are members of a first data structure; and wherein the steps further include modifying the members of the first data structure to point to a third set of functions after performing the step of invoking the first set of functions.

12. The computer-readable storage medium of claim 11, wherein the second set of function pointers are members of an other data structure, and wherein said first data structure and said other data structure have the same data type.

13. The computer-readable storage medium of claim 12, wherein the steps further include said particular application generating said first data structure.

14. The computer-readable storage medium of claim 10, wherein the step of a particular application invoking the first set of functions includes invoking the first set of functions pointed to by members of a first data structure.

15. The computer-readable storage medium of claim 10, wherein the step of invoking the first set of functions includes invoking functions implemented in an other application different than said particular application.

16. The computer-readable storage medium of claim 15, wherein the steps further include the step of said particular application registering said first set of functions with said other application.

17. The computer-readable storage medium of claim 16, wherein the first set of function pointers are members of a data structure pointed to by a first pointer; and the step of registering includes supplying said pointer to said particular application.

18. The computer-readable storage medium of claim 10, wherein the first set of function pointers are members of a first data structure pointed to by a first pointer;

a second data structure includes said first pointer as a member; and said second data structure includes another member that refers to a DOM tree implemented according to said first DOM implementation.

\* \* \* \* \*